United States Patent [19]
Hiratani et al.

[11] Patent Number: 5,703,143
[45] Date of Patent: Dec. 30, 1997

[54] OCULAR LENS MATERIAL

[75] Inventors: Haruyuki Hiratani; Kazuhiko Nakada, both of Kasugai; Toshio Yamazaki; Shoji Ichinohe, both of Gunma-ken, all of Japan

[73] Assignee: Menicon Co., Ltd., Nagoya, Japan

[21] Appl. No.: 590,600

[22] Filed: Jan. 24, 1996

[30] Foreign Application Priority Data

Jan. 26, 1995 [JP] Japan .................................. 7-010721

[51] Int. Cl.$^6$ .................................................. G02C 7/02
[52] U.S. Cl. .......................... 523/107; 523/106; 524/540; 524/588; 525/534; 525/431; 528/86; 351/159
[58] Field of Search ........................ 523/106, 107; 524/540, 588; 528/86; 525/534, 431

[56] References Cited

U.S. PATENT DOCUMENTS

| | | | |
|---|---|---|---|
| 4,859,719 | 8/1989 | Ofstead | 523/108 |
| 5,487,920 | 1/1996 | Lopata et al. | 427/489 |
| 5,504,158 | 4/1996 | Akkapeddi et al. | 528/86 |
| 5,543,442 | 8/1996 | Hiratani et al. | 523/106 |

FOREIGN PATENT DOCUMENTS

| | | |
|---|---|---|
| 0 408 125 | 1/1991 | European Pat. Off. |
| 0 491 191 | 6/1992 | European Pat. Off. |
| 0 592 228 | 4/1994 | European Pat. Off. |
| 0 634 673 | 1/1995 | European Pat. Off. |

OTHER PUBLICATIONS

Database WPI, Derwent Publication Ltd., London, GB; AN 90-344037 and JP-A-02 247 249 (Sumitomo Chem. Ind. KK.) Oct. 3, 1990 (Abstract).
Database WPI, Derwent Publications Ltd., London, GB; AN 92-230606 and JP-A-04 154 826 (Japan Synthetic Rubber Co., Ltd.) May 27, 1992 (Abstract).

*Primary Examiner*—Andrew E. C. Merriam
*Attorney, Agent, or Firm*—Armstrong, Westerman, Hattori, McLeland & Naughton

[57] ABSTRACT

A transparent ocular lens material comprising a silicon-containing polymer having a recurring unit represented by the general formula (I):

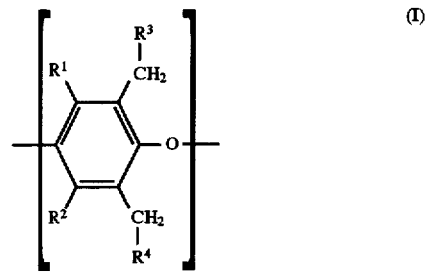

wherein each of $R^1$, $R^2$, $R^3$ and $R^4$ is independently hydrogen atom, an alkyl group having 1 to 5 carbon atoms, an alkoxy group having 1 to 5 carbon atoms or a group represented by the general formula (II):

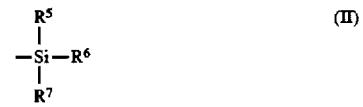

in which each of $R^5$, $R^6$ and $R^7$ is independently an alkyl group having 1 to 5 carbon atoms, an alkoxy group having 1 to 5 carbon atoms or phenyl group. The ocular lens material has excellent transparency, high oxygen permeability and heat resistance, and excellent ultraviolet-ray absorbing properties and forming and processing properties, and has a relatively high refractive index.

4 Claims, No Drawings

OCULAR LENS MATERIAL

BACKGROUND OF THE INVENTION

The present invention relates to a transparent ocular lens material, and more particularly to an ocular lens material having excellent transparency, high oxygen permeability, excellent forming and processing properties and high heat resistance (high glass transition temperature), and moreover having excellent ultraviolet-ray absorbing properties and a relatively high refractive index, which can be suitably used as contact lenses, intraocular lenses, and the like.

Conventionally, for an ocular lens, especially for a contact lens, excellent oxygen permeability has been required as one of important physical properties because there is a necessity to supply a cornea with sufficient amount of oxygen through the lens so that functions of metabolism of corneal tissue would not be lowered.

Also, for an intraocular lens, heat resistance has been required as one of important physical properties so that the intraocular lens can have sufficient heat resistance during autoclaved sterilization of the intraocular lens before inserting the intraocular lens into an eye.

Furthermore, a contact lens or an intraocular lens, in which an ultraviolet-ray absorbing agent is used, has been employed in order to avoid that bad influences owing to ultraviolet-rays are exerted upon eyes. However, the contact lens or the intraocular lens, in which the ultraviolet-ray absorbing agents is used, especially the contact lens having a high oxygen permeability, has a problem in safety such that the ultraviolet-ray absorbing agent easily elutes from the lens.

Accordingly, it has been conventionally desired that an ocular lens material which has transparency, more improved oxygen permeability and heat resistance, and is excellent in ultraviolet-ray absorbing properties is developed without using any ultraviolet-ray absorbing agent.

An object of the present invention is to provide an ocular lens material having excellent transparency and high oxygen permeability.

Another object of the present invention is to provide an ocular lens material having excellent forming and processing property as well as high heat resistance and excellent ultraviolet-ray absorbing properties.

These and other objects of the present invention will become apparent from the description hereinafter.

SUMMARY OF THE INVENTION

In accordance with the present invention, there are provided
a transparent ocular lens material comprising a silicon-containing polymer having a recurring unit represented by the general formula (I):

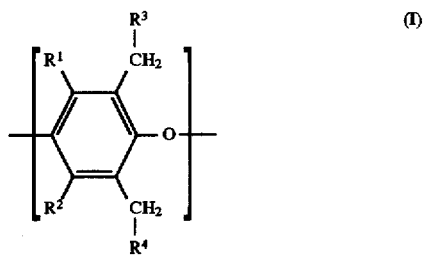

wherein each of $R^1$, $R^2$, $R^3$ and $R^4$ is independently hydrogen atom, an alkyl group having 1 to 5 carbon atoms, an alkoxy group having 1 to 5 carbon atoms or a group represented by the general formula (II):

in which each of $R^5$, $R^6$ and $R^7$ is independently an alkyl group having 1 to 5 carbon atoms, an alkoxy group having 1 to 5 carbon atoms or phenyl group; and
a transparent ocular lens material comprising (A) a silicon-containing polymer having a recurring unit represented by the general formula (I):

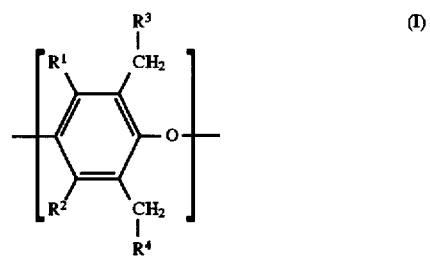

wherein each of $R^1$, $R^2$, $R^3$ and $R^4$ is independently hydrogen atom, an alkyl group having 1 to 5 carbon atoms, an alkoxy group having 1 to 5 carbon atoms or a group represented by the general formula (II):

in which each of $R^5$, $R^6$ and $R^7$ is independently an alkyl group having 1 to 5 carbon atoms, an alkoxy group having 1 to 5 carbon atoms or phenyl group, and (B) a condensation polymer having a recurring unit represented by the general formula (III):

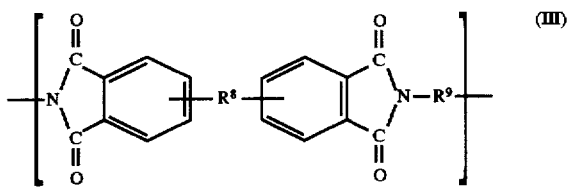

wherein $R^8$ is —O—, —CO—, —SO$_2$—, —CH$_2$—, —C(CH$_3$)$_2$—, —C(CF$_3$)$_2$— or a group represented by the general formula:

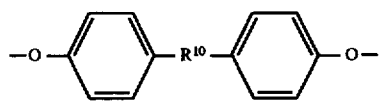

in which $R^{10}$ is —C(CH$_3$)$_2$— or —C(CF$_3$)$_2$—, and $R^9$ is a group represented by the general formula:

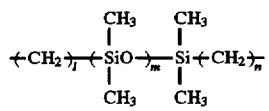

in which l is an integer of 1 to 3, m is an integer of 1 to 15 and n is an integer of 1 to 3, a group represented by the general formula:

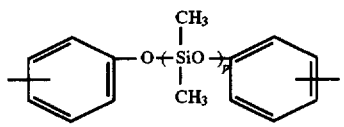

in which p is an integer of 1 to 10, a group represented by the general formula:

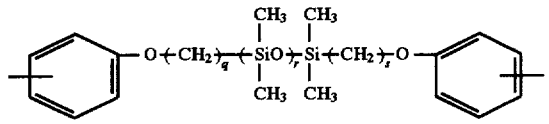

in which q is an integer of 1 to 3, r is an integer of 1 to 10 and s is an integer of 1 to 3, a group represented by the general formula:

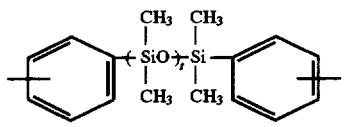

in which t is an integer of 1 to 10, a group represented by the general formula:

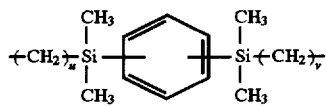

in which u is an integer of 1 to 3 and v is an integer of 1 to 3, a group represented by the general formula:

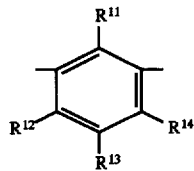

in which each of $R^{11}$, $R^{12}$, $R^{13}$ and $R^{14}$ is independently hydrogen, atom or an alkyl group having 1 to 5 carbon atoms, or a group represented by the general formula:

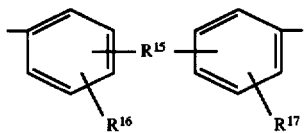

in which $R^{15}$ is —C(CH$_3$)$_2$—, —C(CF$_3$)$_2$—, —O—, a group represented by the formula:

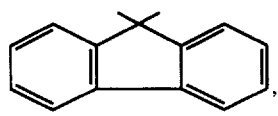

a group represented by the general formula:

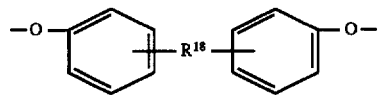

in which $R^{18}$ is —SO$_2$—, —C(CH$_3$)$_2$— or —C(CF$_3$)$_2$—, or a direct bond, and each of $R^{16}$ and $R^{17}$ is independently an alkyl group having 1 to 3 carbon atoms, a fluoroalkyl group having 1 to 3 carbon atoms, hydrogen atom, hydroxyl group or carboxyl group.

DETAILED DESCRIPTION

The transparent ocular lens material of the present invention comprises, as mentioned above, a silicon-containing polymer having a recurring unit represented by the general formula (I):

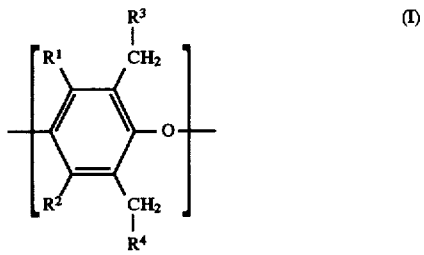

wherein each of $R^1$, $R^2$, $R^3$ and $R^4$ is independently hydrogen atom, an alkyl group having 1 to 5 carbon atoms, an alkoxy group having 1 to 5 carbon atoms or a group represented by the general formula (II):

in which each of $R^5$, $R^6$ and $R^7$ is independently an alkyl group having 1 to 5 carbon atoms, an alkoxy group having 1 to 5 carbon atoms or phenyl group.

The silicon-containing polymer having a recurring unit represented by the general formula (I) (hereinafter referred to as "polymer (A)") is a component which especially improves transparency, forming and processing properties (film-forming property) and oxygen permeability of an obtained ocular lens material, which has a high glass transition temperature and improves heat resistance of the obtained ocular lens material, and moreover which improves ultraviolet-ray absorbing properties and refractive index of the ocular lens material.

Substituent groups $R^1$, $R^2$, $R^3$ and $R^4$ of the recurring unit of the polymer (A) used in the present invention may be the same or different in each recurring unit.

There are no particular limitations in the process for preparing the polymer (A). For instance, a method for subjecting poly(2,6-dimethylphenylene ether) to silylation and the like can be employed.

There are no particular limitations in the method for subjecting poly(2,6-dimethylphenylene ether) to silylation. For instance, there are the following method and the like.

At first, poly(2,6-dimethylphenylene ether) is usually reacted with an organoalkaline metal compound in the presence of a solvent which is sufficiently dried.

As the above organoalkaline metal compound, there can be cited, for instance, alkaline metal-containing alkyl compounds such as an alkyl lithium, an alkyl potassium, an alkyl rubidium and an alkyl cesium; alkaline metal-containing aryl compounds such as an aryl lithium, an aryl potassium, an aryl rubidium and an aryl cesium; and the like. Among them, an alkyl lithium is preferable from the viewpoints that its handling is easy and that its operability is excellent.

The amount of the organoalkaline metal compound may be suitably adjusted to a desired amount according to the amount of a silicon-containing group which is introduced in a recurring unit of poly(2,6-dimethylphenylene ether). It is desired that the amount of the organoalkaline metal compound is usually 0.1 to 5 moles or so based on 1 mole of the recurring unit of poly(2,6-dimethylphenylene ether).

As the above solvent, there is desired a solvent which substantially does not react with the organoalkaline metal compound and in which poly(2,6-dimethylphenylene ether) can be dissolved. For instance, there can be cited benzene, toluene, xylene, tetrahydrofuran and the like.

It is desired that the reaction of poly(2,6-dimethylphenylene ether) with the organoalkaline metal compound is carried out, for instance, at a reaction temperature of $-50°$ to $50°$ C. or so and for a reaction time of 1 to 24 hours or so.

The above poly(2,6-dimethylphenylene ether) is reacted with the organoalkaline metal compound, thereby an alkaline metal is added to non-substituted carbon atoms in phenylene rings of a main chain and α-carbon atoms in methyl groups of side chains, which exist in the recurring unit of poly(2,6-dimethylphenylene ether).

Next, the obtained alkaline metal adduct of polyphenylene ether is reacted with a halogenated silane compound.

When the reaction of the above alkaline metal adduct of polyphenylene ether with the halogenated silane compound is carried out, it is desired that without the isolation of the alkaline metal adduct of polyphenylene ether, to a reaction solution of the above poly(2,6-dimethylphenylene ether) and the organoalkaline metal compound is usually added intact the halogenated silane compound and then, the reaction is carried out at $-50°$ to $50°$ C. or so for 0.5 to 24 hours or so.

As the halogenated silane compound, there can be cited, for instance, a compound represented by the general formula:

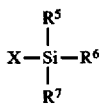

wherein each of $R^5$, $R^6$ and $R^7$ is independently an alkyl group having 1 to 5 carbon atoms, an alkoxy group having 1 to 5 carbon atoms or phenyl group, and X is chlorine atom, bromine atom or iodine atom; and the like. As concrete examples of the halogenated silane compound, there can be, cited, for instance, chlorosilane compounds such as trimethylchlorosilane, triethylchlorosilane, tripropylchlorosilane, trimethoxychlorosilane, triethoxychlorosilane and dimethylphenylchlorosilane, and the like.

It is desired that the amount of the halogenated silane compound is determined according to the amount of the alkaline metal which has been added to the alkaline metal adduct of polyphenylene ether. It is desired that the amount of the halogenated silane compound is usually 1 to 5 moles or so based on 1 mole of the added alkaline metal.

During the reaction of poly(2,6-dimethylphenylene ether) with the organoalkaline metal compound and the reaction of the alkaline metal adduct of polyphenylene ether which is obtained by the above reaction, with the halogenated silane compound, it is desired that a catalyst such as N,N,N',N'-tetramethylethylenediamine is used because the substituted ratio to the silicon-containing group in a resulting polymer (A) can be greatly increased.

In the present invention, in order to more increase the substituted ratio to the silicon-containing group in a resulting polymer (A), a previously prepared polymer (A) may be used instead of poly(2,6-dimethylphenylene ether), and the polymer (A) may be reacted with the organoalkaline metal compound and successively with the halogenated silane compound.

A solution of the thus prepared polymer (A) is added to a poor solvent of the polymer (A), such as methanol, ethanol, propanol, hexane, cyclohexane or acetone, and the polymer (A) is precipitated from the poor solvent and filtered off.

In order to improve transparency, film-forming property, oxygen permeability and the like of the ocular lens material, it is desired that the substituted ratio to the silicon-containing group in the thus obtained polymer (A) having a recurring unit represented by the general formula (I), that is, the ratio of numbers of the group represented by the general formula (II) which is incorporated in $R^1$, $R^2$, $R^3$ and $R^4$ of the polymer (A) to the total numbers of $R^1$, $R^2$, $R^3$ and $R^4$ of the polymer (A) is 0.1 to 100% by mole, preferably 2 to 100% by mole.

The substituted ratio to the silicon-containing group and the existent position of the silicon-containing group in the polymer (A) can be ascertained by measuring $^1$H-nuclear magnetic resonance spectrum (hereinafter referred to as "$^1$H-NMR") of the polymer (A).

For instance, in consideration of film-forming property during the preparation of the ocular lens by forming a film from an obtained ocular lens material, it is desired that the weight average molecular weight of the polymer (A) is at least 20000. Also, in consideration of workability such as easiness of handling, it is desired that the weight average molecular weight of the polymer (A) is at most 500000.

In the present invention, the polymer (A) can be used alone or in an admixture thereof. Also, in order to sufficiently exhibit the effects for improving transparency, forming and processing properties, oxygen permeability, heat resistance, ultraviolet-ray absorbing properties and refractive index according to the use of the polymer (A), it is desired that the content of the polymer (A) in the ocular lens material of the present invention is adjusted to 50 to 100% by weight, preferably 70 to 100% by weight.

In addition to the polymer (A), unless an obtained ocular lens material becomes opaque, other polymers can be contained in the ocular lens material of the present invention.

As the above other polymers, there can be used polymers which can improve heat resistance, oxygen permeability, ultraviolet-ray absorbing properties and the like of an obtained ocular lens material.

As a suitable example of the other polymers, there can be cited a condensation polymer (polyimide) described in Japanese Patent Application No. 160348/1994, which has a recurring unit represented by the general formula (III):

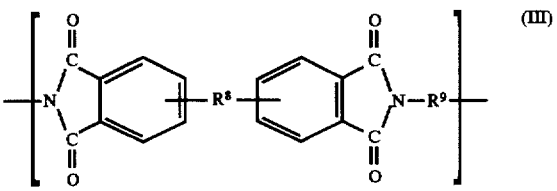

wherein $R^8$ is $-O-$, $-CO-$, $-SO_2-$, $-CH_2-$, $-C(CH_3)_2-$, $-C(CF_3)_2-$ or a group represented by the general formula:

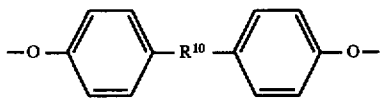

in which $R^{10}$ is —C(CH$_3$)$_2$— or —C(CF$_3$)$_2$—, and $R^9$ is a group represented by the general formula:

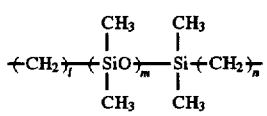

in which l is an integer of 1 to 3, m is an integer of 1 to 15 and n is an integer of 1 to 3, a group represented by the general formula:

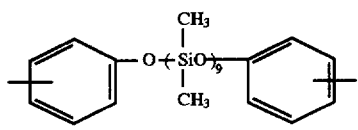

in which p is an integer of 1 to 10, a group represented by the general formula:

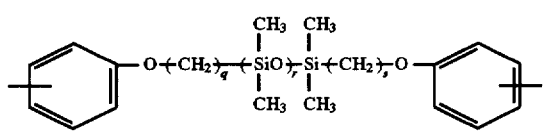

in which q is an integer of 1 to 3, r is an integer of 1 to 10 and s is an integer of 1 to 3, a group represented by the general formula:

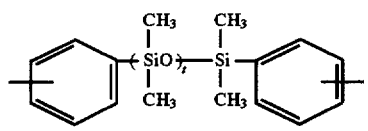

in which t is an integer of 1 to 10, a group represented by the general formula:

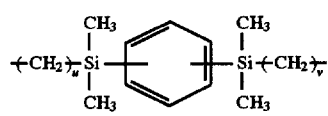

in which u is an integer of 1 to 3 and v is an integer of 1 to 3, a group represented by the general formula:

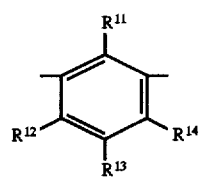

in which each of $R^{11}$, $R^{12}$, $R^{13}$ and $R^{14}$ is independently hydrogen atom or an alkyl group having 1 to 5 carbon atoms, or a group represented by the general formula:

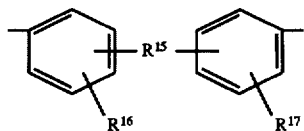

in which $R^{15}$ is —C(CH$_3$)$_2$—, —C(CF$_3$)$_2$—, —O—, a group represented by the formula:

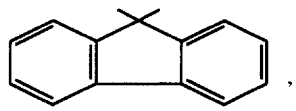

a group represented by the general formula:

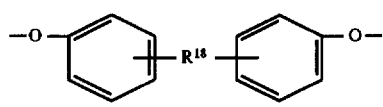

in which $R^{18}$ is —SO$_2$—, —C(CH$_3$)$_2$— or —C(CF$_3$)$_2$—, or a direct bond, and each of $R^{16}$ and $R^{17}$ is independently an alkyl group having 1 to 3 carbon atoms, a fluoroalkyl group having 1 to 3 carbon atoms, hydrogen atom, hydroxyl group or carboxyl group.

The above condensation polymer is prepared by the condensation polymerization of a monomer mixture comprising an aromatic tetracarboxylic acid dianhydride represented by the general formula:

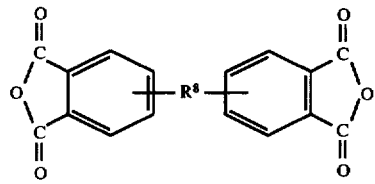

wherein $R^8$ is —O—, —CO—, —SO$_2$—, —CH$_2$—, —C(CH$_3$)$_2$—, —C(CF$_3$)$_2$— or a group represented by the general formula:

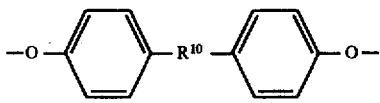

in which $R^{10}$ is —C(CH$_3$)$_2$— or —C(CF$_3$)$_2$—, such as a compound represented by the formula:

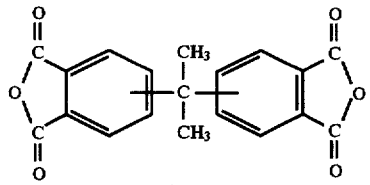

a compound represented by the formula:

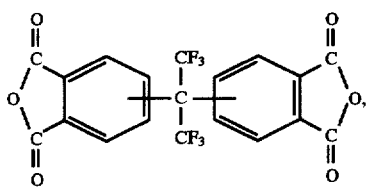

a compound represented by the formula:

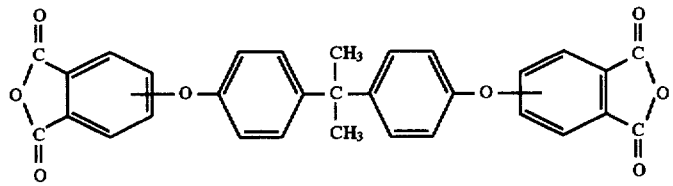

or a compound represented by the formula:

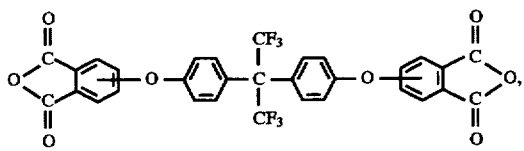

and at least one diamino compound selected from a silicon-containing diamine represented by the general formula:

H₂N—R¹⁹—NH₂ wherein R¹⁹ is a group represented by the general formula:

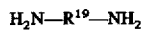

in which l is an integer of 1 to 3, m is an integer of 1 to 15 and n is an integer of 1 to 3, a group represented by the general formula:

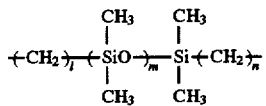

in which p is an integer of 1 to 10, a group represented by the general formula:

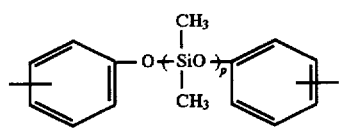

in which q is an integer of 1 to 3, r is an integer of 1 to 10 and s is an integer of 1 to 3, a group represented by the general formula:

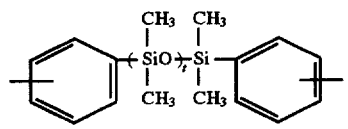

in which t is an integer of 1 to 10, or a group represented by the general formula:

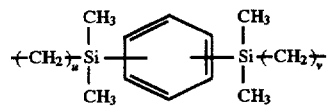

in which u is an integer of 1 to 3 and v is an integer of 1 to 3, such as 1,3-bis(3-aminopropyl)-1,1,3,3-tetramethyldisiloxane, 1,4-bis(3-aminopropyldimethylsilyl)benzene, 1,3-bis(2-aminoethyl)-1,1,3,3-tetramethyldisiloxane, 1,3-bis(aminomethyl)-1,1,3,3-tetramethyldisiloxane or di(p-aminophenoxy)dimethylsilane, a diamino-substituted benzene represented by the general formula:

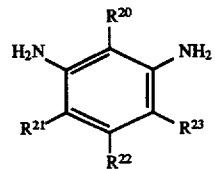

wherein each of R²⁰, R²¹, R²² and R²³ is independently hydrogen atom or an alkyl group having 1 to 5 carbon atoms, such as 2,4-diamino-1,3,5-trimethylbenzene, 2,4-diamino-1,3,5-triethylbenzene, 2,4-diamino-1,3,5-tri-n-propylbenzene, 2,4-diamino-1,3,5-tri-i-propylbenzene, 3,5-diaminotoluene, 3,5-diamino-o-xylene or 2,5-diamino-m-xylene, and a diamino-substituted diphenyl represented by the general formula:

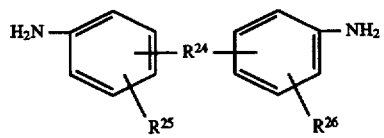

wherein R²⁴ is —C(CH₃)₂—, —C(CF₃)₂—, —O—, a group represented by the formula:

a group represented by the general formula:

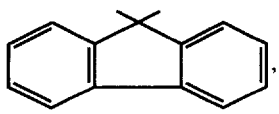

a group represented by the general formula:

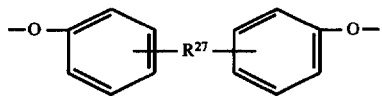

in which $R^{27}$ is $—SO_2—$, $—C(CH_3)_2—$ or $—C(CF_3)_2—$, or a direct bond, and each of $R^{25}$ and $R^{26}$ is independently an alkyl group having 1 to 3 carbon atoms, a fluoroalkyl group having 1 to 3 carbon atoms, hydrogen atom, hydroxyl group or carboxyl group, such as 2,2-bis(aminohydroxyphenyl) hexafluoropropane represented by the formula:

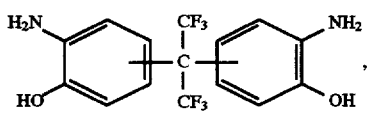

such as 2,2-bis(3-amino-4-hydroxyphenyl) hexafluoropropane, 2,2-bis(aniinomethylphenyl) hexafluoropropane represented by the formula:

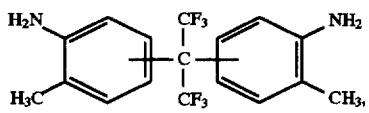

such as 2,2-bis(3-amino-4-methylphenyl) hexafluoropropane, 2,2'-bis(trifluoromethyl)benzidine represented by the formula:

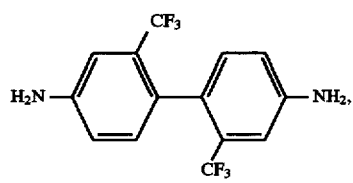

9,9-bis(4-aminophenyl)fluorene represented by the formula:

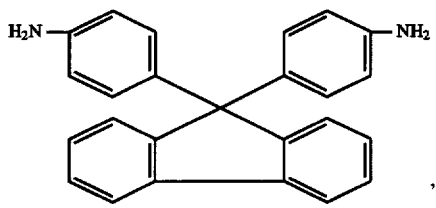

2,2-bis(3-amino-4-carboxyphenyl) hexafluoropropane, 2,2-bis(3-amino-4-ethylphenyl)hexafluoropropane, 2,2'-bis(trifluoroethyl)benzidine, a compound represented by the formula:

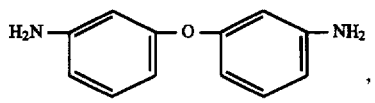

a compound represented by the formula:

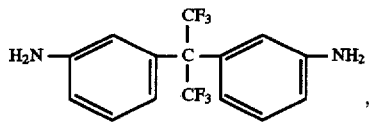

a compound represented by the formula:

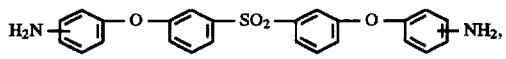

a compound represented by the formula:

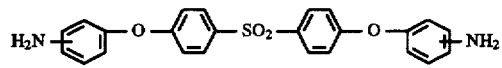

or a compound represented by the formula:

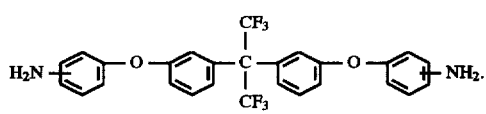

In addition, as examples of the other polymers, there can be cited, for instance, polyimides described in, for instance, Japanese Unexamined Patent Publication No. 226359/1988, No. 252159/1988, No. 204672/1989, No. 313058/1989, No. 222960/1991, No. 205050/1991 and No. 220210/1993, U.S. Pat. No. 4,955,900, U.S. Pat. No. 5,049,156 and U.S. Pat. No. 5,260,352, and the like. The other polymers can be used by selecting one or more from them.

In order to avoid that the content of the polymer (A) in the ocular lens material becomes relatively low and that it becomes difficult to exhibit the effects based upon the use of the polymer (A), it is desired that the content of the other polymers in the ocular lens material of the present invention is adjusted to 0 to 50% by weight, preferably 0 to 30% by weight.

As typical methods for producing an ocular lens by using an ocular lens material comprising the polymer (A) and, as occasion demands, the other polymers, there can be cited, for instance, a casting method, a heat compression molding method using a powdered ocular lens material, and the like.

The above casting method is a method comprising the steps of dissolving the polymer (A) and, as occasion demands, the other polymers in an organic solvent such as toluene, benzene, tetrahydrofuran, 1,4-dioxane, chloroform or tetrachloromethane to give a solution, spreading the solution on a plate such as a glass plate or a stainless steel plate in a predetermined thickness, heating the plate at a temperature of 100° to 150° C. or so for 30 to 120 minutes or so to form coating films, laminating necessary number of sheets of the coating films for obtaining a laminal formed article having a predetermined thickness, molding the formed article by a heat compression molding method at a temperature of 200° to 500° C. or so under a pressure of 0.5 to 10 t/cm² or so for 0.1 to 10 hours or so to give a transparent molded article of the polymer, and subjecting the molded article to a mechanical process by means of an apparatus such as a cutting apparatus or a grinding apparatus to form an ocular lens shape.

When the above casting method is employed, the heating of the plate and the removing of the organic solvent from the solution can be continuously carried out, and the plate can be heated and the organic solvent can be removed from the solution under a reduced pressure or in an atmosphere of an inert gas.

The above heat compression molding method using a powdered ocular lens material is a method comprising the steps of subjecting a powdered polymer (A) and, as occasion demands, other powdered polymers to a heat compression molding method at a temperature of 200° to 500° C. or so under a pressure of 0.5 to 10 t/cm$^2$ or so for 0.1 to 10 hours or so to give a transparent molded article of the polymer and subjecting the molded article to a mechanical process by means of an apparatus such as a cutting apparatus or a grinding apparatus to form an ocular lens shape.

In the casting method and the heat compression molding method using a powdered ocular lens material, as a method for producing an ocular lens by mechanically processing a molded article of a polymer, there can be cited, for instance, a method comprising grinding a curved surface of the molded article in accordance with the fitting power of a lens to give an ocualr lens, and the like. When a film of a polymer is used, an ocular lens can be produced by providing the inside of a mold having a shape corresponding to a contact lens, an intraocular lens or the like with the film and molding the film. In this case, the obtained ocular lens may be subjected to, as occasion demands, a mechanical finishing process.

As one example of the above ocular lenses, when an intraocular lens is produced, a hole for fixing parts may be produced in lens parts of the intraocular lens and the fixing parts may be united with the lens parts at the hole by spot heating.

There are no particular limitations of the shape of the fixing parts of the intraocular lens, and the shape may be adjusted in accordance with a desired shape. As the material of the fixing parts, there can be cited, for instance, polypropylene, polyvinylidene fluouride, polymethyl metahcrylate and the like. However, the material of the fixing parts used in the present invention is not limited to the exemplified ones. In the present invention, the material of the fixing parts and that of the lens parts of the intraocular lens may be the same or different.

In the present invention, as mentioned above, an intraocular lens can be produced not by employing a method comprising producing the lens parts and the fixing parts separately and uniting the lens parts with the fixing parts but by employing a method comprising molding the lens parts and the fixing parts which are united in a body. When the intraocular lens produced by molding the lens parts and the fixing parts which are united in a body is used, it is possible to prevent the detachment of the fixing parts from the lens parts because there are no jointed portions of the lens parts and the fixing parts in the intraocular lens.

The ocular lens material of the present invention is more specifically described and explained by means of the following Examples. It is to be understood that the present invention is not limited to the Examples, and various changes and modifications may be made in the invention without departing from the spirit and scope thereof.

EXAMPLE 1

In a 500 ml flask, under a current of dried nitrogen gas, 4 g (33 mmoles) of poly(2,6-dimethylphenylene ether) and 4 ml (34 mmoles) of N,N,N',N'-tetramethylethylenediamine were dissolved in 280 ml of benzene to give a solution. The obtained solution was cooled to 0° C., and 21.2 ml of 15% hexane solution of n-butyl lithium (34 mmoles) was added thereto, and then, the solution was stirred for 1.5 hours to give a mixed solution. After that, 4.8 ml (44 mmoles) of trimethylchlorosilane was added to the mixed solution, and the mixed solution was stirred for 2 hours to give a reaction solution.

The obtained reaction solution was added to methanol to precipitate powder. The precipitated powder was filtered off, washed with methanol and dried under the reduced pressure for at least 10 hours to give powder of trimethylsilylated polyphenylene ether. The weight average molecular weight of the obtained trimethylsilylated polyphenylene ether was 57000.

The substituted ratio to the silicon-containing group (trimethylsilyl group) in the obtained trimethylsilylated polyphenylene ether was ascertained by measuring $^1$H-NMR (60 MH$_z$) of the trimethylsilylated polyphenylene ether by means of a NMR spectrometer commercially available from JEOL LTD. under the trade name of JNM-PMX60. The substituted ratio was 46% by mole.

The obtained powder of trimethylsilylated polyphenylene ether was subjected to a compression molding method to give a plate having a thickness of 4 mm.

The obtained powder of trimethylsilylated polyphenylene ether was dissolved in toluene to give a solution. The solution was spread on a glass plate to form a coating film. The coating film was dried under the reduced pressure for at least 20 hours to give a film having a thickness of 0.2 mm.

As physical properties of the powder, the plate or the film of trimethylsilylated polyphenylene ether, film-forming property, oxygen permeability, refractive index, glass transition temperature and ray-transmitting properties were examined in accordance with the following methods. The results are shown in Table 1.

(A) Film-forming property

Transparency and strength of the film were evaluated in accordance with the following criteria for evaluation.

[Criteria for evaluation]

A: Transparence is observed with naked eyes. No brittleness when bending and high strength are observed.

B: No brittleness when bending and a little small strength are observed. However, its transparency is a little bad when observing with naked eyes.

C: Opacity is observed with naked eyes, and/or film is not formed.

(B) Oxygen permeability

The oxygen permeability of the film dipped in saline at 35° C. was measured by means of a Seikaken-type film oxygen-gas permeater commercially available from RIKASEIKI KOGYO CO., LTD. The value of the oxygen permeability listed on Table 1 means a value when the original value of the oxygen permeability is multiplied by $10^{11}$, and the unit of its value is (cm$^2$-/sec)·(ml O$_2$/(ml× mmHg)).

(C) Refractive index

The refractive index ($n^{25}{}_D$) of the plate was measured by means of a Abbe's refractometer commercially available from ATAGO CO., LTD. under the trade name of 1-T under the conditions that the temperature was 25° C. and that the relative humidity was 50%.

(D) Glass transition temperature

As an index of heat resistance, the glass transition temperature (°C.) of the powder was measured under the following conditions.

Measuring apparatus: SSC/5200H and DSC220C commercially available from Seiko Instruments Inc.

Rate of increasing temperature: 20° C./min.

Measuring temperature: 100° to 300° C.

(E) Ray-transmitting properties

By means of a UV-3100 automatic recording spectrophotometer commercially available from SHIMADZU CORPORATION, rays in the wavelength region of 780 to 190 nm were irradiated to the film dipped in distilled water at 20° C. The transmittance (%) in visible-ray region (wavelength: 780 to 380 nm) was measured. Also, a wavelength region (nm) showing a transmittance of 0% was measured in ultraviolet-ray region (wavelength: at most 380 nm).

Moreover, in the present invention, when the above transmittance of the film in the visible-ray region is at least 90%, it is judged that the film has sufficient transparency as an ocular lens material.

EXAMPLE 2

Powder, a plate and a film of trimethylsilylated polyphenylene ether were obtained in the same manner as in Example 1 except that 5 g (33 mmoles) of trimethylsilylated polyphenylene ether obtained in Example 1 was used instead of 4 g (33 mmoles) of poly(2,6-dimethylphenylene ether). The weight average molecular weight of the obtained trimethylsilylated polyphenylene ether was 58000.

The substituted ratio to the silicon-containing group (trimethylsilyl group) in the obtained trimethylsilylated polyphenylene ether was ascertained in the same manner as in Example 1. As a result, the substituted ratio was 78% by mole.

The physical properties of the powder, the plate or the film of trimethylsilylated polyphenylene ether were examined in the same manner as in Example 1. The results are shown in Table 1.

EXAMPLE 3

Powder, a plate and a film of triethylsilylated polyphenylene ether were obtained in the same manner as in Example 1 except that 6.7 ml (44 mmoles) of triethylchlorosilane was used instead of 4.8 ml (44 mmoles) of trimethylchlorosilane.

The physical properties of the powder, the plate or the film of triethylsilylated polyphenylene ether were examined in the same manner as in Example 1. The results are shown in Table 1.

EXAMPLE 4

Powder, a plate and a film of dimethylphenylsilylated polyphenylene ether were obtained in the same manner as in Example 1 except that 7.5 g (44 mmoles) of dimethylphenylchlorosilane was used instead of 4.8 ml (44 mmoles) of trimethylchlorosilane.

The physical properties of the powder, the plate or the film of dimethylphenylsilylated polyphenylene ether were examined in the same manner as in Example 1. The results are shown in Table 1.

EXAMPLE 5

The atmosphere of a 500 ml separable flask equipped with a dropping funnel, a conduit pipe for introducing nitrogen gas, a mechanical stirrer and a calcium chloride cylinder was replaced with dried nitrogen gas.

The above separable flask was charged with 22.2 g (0.05 mole) of diphenylhexafluoroisopropylidenetetracarboxylic acid dianhydride represented by the formula:

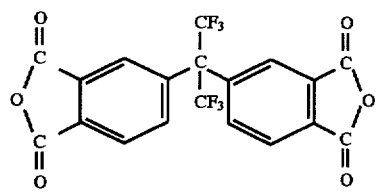

and 70 g of N,N-dimethylacetamide as a polymerization solvent of a polyimide. While stirring the mixture in the separable flask at room temperature, a mixed solution of 15.5 g (0.05 mole) of 1,4-bis(3-aminopropyldimethylsilyl) benzene represented by the formula:

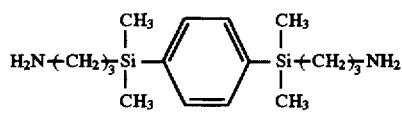

and 50 g of N,N-dimethylacetamide was added dropwise with the dropping funnel to the separable flask to give a polyamide acid solution.

To the obtained polyamide acid solution, 30.6 g (0.3 mole) of acetic anhydride and 15.8 g (0.2 mole) of pyridine were added with stirring. Then, the mixture in the separable flask was stirred for 10 hours or so to give a polyimide solution.

To a 5 l beaker, about 1 l of methanol was added as a poor solvent of the polyimide. While stirring the methanol with a stirrer, about a half amount of the above polyimide solution (about 100 g) was added dropwise with the dropping funnel to the beaker to give a powdery polyimide.

The obtained powdery polyimide was filtered off with a Nutsche and pulverized with a pulverizer to give polyimide particles.

The obtained polyimide particles were added to a 1 l beaker and washed with about 500 ml of methanol with stirring on a water bath at 50° C. After 20 minutes passed, the polyimide particles were filtered off, washed once again and dried in a vacuum drier at 90° C. to give powdered polyimide.

On a glass plate, was casted 20% by weight toluene solution of a mixture composed of 10% by weight of the powdered polyimide and 90% by weight of the powder of trimethylsilylated polyphenylene ether obtained in Example 1. The glass plate was allowed to stand at room temperature for 1 week to give a film having a thickness of about 2 mm.

The physical properties of the obtained film were examined in the same manner as in Example 1. The results are shown in Table 1. In Example 5, the item (C) Refractive index and the item (D) Glass transition temperature were examined by using the film instead of the plate and the powder, respectively.

Comparative Example 1

It was tried to produce a plate and a film by using the powder of poly(2,6-dimethylphenylene ether) which is the same as used in Example 1 in the same manner as in Example 1. However, it was impossible to produce a plate and a film, so that the physical properties could not be measured.

TABLE 1

|  | Physical properties | | | | Ray-transmitting properties | |
|---|---|---|---|---|---|---|
|  | Film-forming property | Oxygen permeability | Refractive index (−) | Glass transition temperature (°C.) | Transmittance in visible-ray region (%) | Wavelength region showing transmittance of 0% in ultraviolet-ray region (nm) |
| Ex. No. | | | | | | |
| 1 | A | 50 | 1.559 | 225 | 90≦ | 320≧ |
| 2 | A | 72 | 1.550 | 226 | 90≦ | 320≧ |
| 3 | A | 26 | 1.574 | 190 | 90≦ | 320≧ |
| 4 | A | 20 | 1.580 | 181 | 90≦ | 320≧ |
| 5 | A | 13 | 1.560 | 140≦ | 90≦ | 330≧ |
| Com. Ex. | | | | | | |
| 1 | C | — | — | — | — | — |

From the results shown in Table 1, it can be seen that materials comprising polyphenylene ether obtained in Examples 1 to 5 have relatively high oxygen permeabilities and are excellent in forming and processing properties based on excellent film-forming property. A/so, it can be seen that these materials have high glass transition temperatures of at least a treatment temperature for autoclaved sterilization (usually, 120° C. or so) and are excellent in heat resistance, and moreover that the materials have a high visible-ray transmittance of at least 90% and are excellent in transparency. Also, it can be seen that these materials have a wide wavelength region showing a transmittance of 0% in ultraviolet-ray region and are extremely excellent in ultraviolet-ray absorbing properties, and that the materials have relatively high refractive index. Accordingly, it can be seen that the materials are very suitable for ocular lens materials.

Furthermore, because a material obtained in Example 5 comprises the polyimide in addition to the polyphenylene ether, the material has, in particular, a wider wavelength region showing a trasmittance of 0% in ultraviolet-ray region and is more excellent in ultraviolet-ray absorbing properties in comparison with the materials obtained in Examples 1 to 4.

The ocular lens material of the present invention has excellent transparency, high oxygen permeability, excellent forming and processing properties and high heat resistance, and moreover has excellent ultraviolet-ray absorbing properties and a relatively high refractive index. Accordingly, the ocular lens materials of the present invention can be suitably used as, for instance, contact lenses, intraocular lenses and the like.

In addition to the ingredients used in the Examples, other ingredients can be used in the Examples as set forth in the specification to obtain substantially the same results.

What is claimed is:

1. A transparent ocular lens material comprising a silicon-containing polymer having a recurring unit represented by the general formula (I):

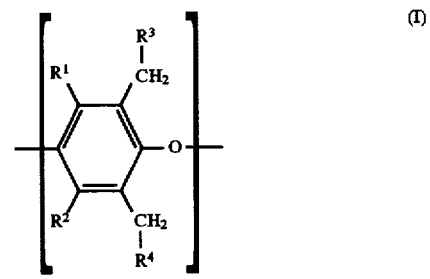

wherein each of $R^1$, $R^2$, $R^3$ and $R^4$ is independently hydrogen atom, an alkyl group having 1 to 5 carbon atoms, an alkoxy group having 1 to 5 carbon atoms or a group represented by the general formula (II):

in which each of $R^5$, $R^6$ and $R^7$ is independently an alkyl group having 1 to 5 carbon atoms, an alkoxy group having 1 to 5 carbon atoms or phenyl group, and at least one of $R^1$, $R^2$, $R^3$ and $R^4$ is the group represented by the general formula (II), wherein the content of said silicon-containing polymer is 50 to 100% by weight.

2. A transparent ocular lens material comprising (A) a silicon-containing polymer having a recurring unit represented by the general formula (I):

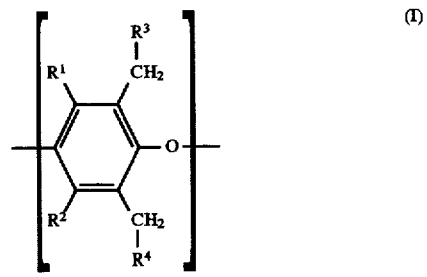

wherein each of $R^1$, $R^2$, $R^3$ and $R^4$ is independently hydrogen atom, an alkyl group having 1 to 5 carbon atoms, an alkoxy group having 1 to 5 carbon atoms or a group represented by the general formula (II):

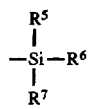 (II)

in which each of $R^5$, $R^6$ and $R^7$ is independently an alkyl group having 1 to 5 carbon atoms, an alkoxy group having 1 to 5 carbon atoms or phenyl group, and at least one of $R^1$, $R^2$, $R^3$ and $R^4$ is the group represented by the general formula (II), and (B) a condensation polymer having a recurring unit represented by the general formula (III):

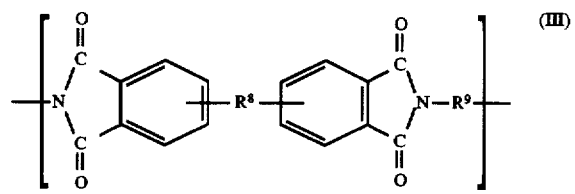 (III)

wherein $R^8$ is —O—, —CO—, —SO$_2$—, —CH$_2$—, —C(CH$_3$)$_2$—, —C(CF$_3$)$_2$— or a group represented by the general formula:

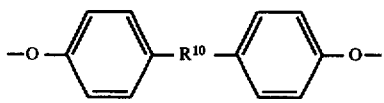

in which $R^{10}$ is —C(CH$_3$)$_2$— or —C(CF$_3$)$_2$—, and $R^9$ is a group represented by the general formula:

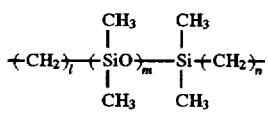

in which l is an integer of 1 to 3, m is an integer of 1 to 15 and n is an integer of 1 to 3, a group represented by the general formula:

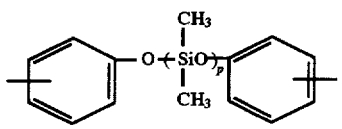

in which p is an integer of 1 to 10, a group represented by the general formula:

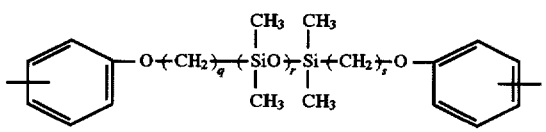

in which q is an integer of 1 to 3, r is an integer of 1 to 10 and s is an integer of 1 to 3, a group represented by the general formula:

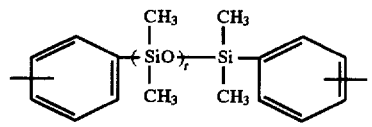

in which t is an integer of 1 to 10, a group represented by the general formula:

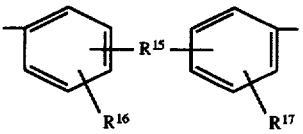

in which u is an integer of 1 to 3 and v is an integer of 1 to 3, a group represented by the general formula:

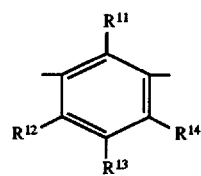

in which each of $R^{11}$, $R^{12}$, $R^{13}$ and $R^{14}$ is independently hydrogen atom or an alkyl group having 1 to 5 carbon atoms, or a group represented by the general formula:

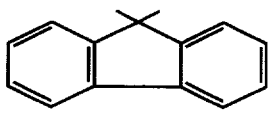

in which $R^{15}$ is —C(CH$_3$)$_2$—, —C(CF$_3$)$_2$—, —O—, a group represented by the formula:

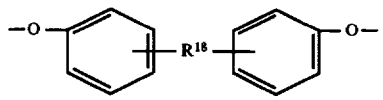

a group represented by the general formula:

in which $R^{18}$ is —SO$_2$—, —C(CH$_3$)$_2$— or —C(CF$_3$)$_2$—, or a direct bond, and each of $R^{16}$ and $R^{17}$ is independently an alkyl group having 1 to 3 carbon atoms, a fluoroalkyl group having 1 to 3 carbon atoms, hydrogen atom, hydroxyl group or carboxyl group, wherein the content of said silicon-containing polymer (A) is 50 to 100% by weight.

3. The ocular lens material of claim 1, wherein the ratio of numbers of the group represented by the general formula (II) which is incorporated in $R^1$, $R^2$, $R^3$ and $R^4$ of said silicon-containing polymer to the total numbers of $R^1$, $R^2$, $R^3$ and $R^4$ of the polymer is 2 to 100% by mole.

4. The ocular lens material of claim 2, wherein the ratio of numbers of the group represented by the general formula (II) which is incorporated in $R^1$, $R^2$, $R^3$ and $R^4$ of said silicon-containing polymer (A) to the total numbers of $R^1$, $R^2$, $R^3$ and $R^4$ of the polymer (A) is 2 to 100% by mole.

* * * * *